United States Patent Office 2,837,163
Patented June 3, 1958

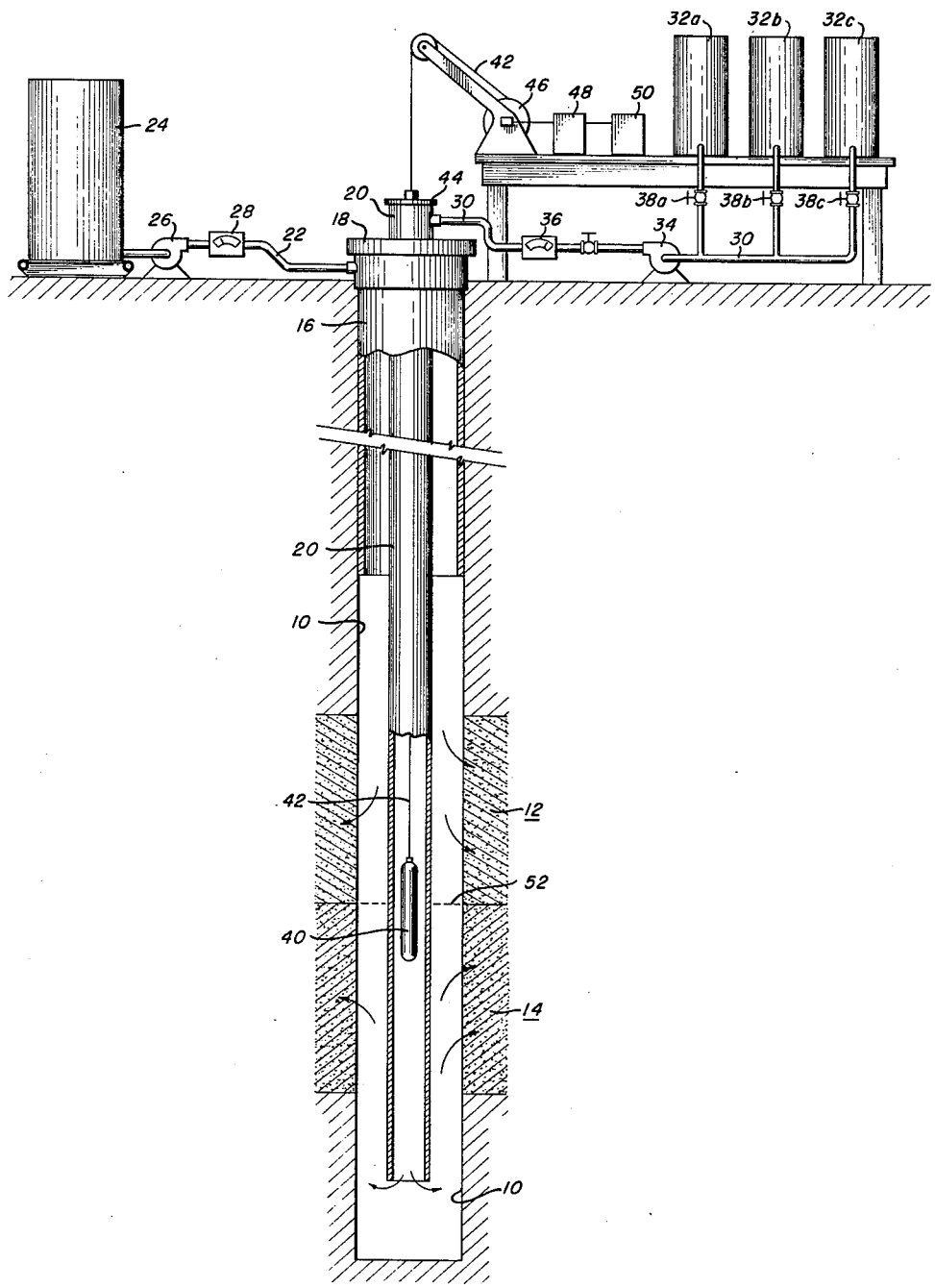

2,837,163

SELECTIVE PLUGGING OF UNDERGROUND WELL STRATA

Joe Ramos and Wayne F. Hower, Duncan, Okla., assignors to Halliburton Oil Well Cementing Company, Duncan, Okla.

Application December 22, 1955, Serial No. 554,685

11 Claims. (Cl. 166—10)

This invention relates generally to methods of reducing the permeability of underground earth and rock strata penetrated by bore holes. More particularly, the invention relates to a method of forming plugging deposits or precipitates in the pore spaces and flow channels of a selected underground permeable zone or well formation in order to at least partially obstruct or block the flow of fluid therethrough.

The invention provides particular advantages when applied in connection with well operations wherein it is desired to reduce the permeability of a selected permeable zone or formation through which water or other aqueous fluid is to be conducted. This may be desirable, for example, during the course of operating a water-injection or salt water-disposal well.

Thus, the invention may be applied in connection with the water-flooding of oil fields, such as where attempts are made to increase or sustain the productivity of a field by injecting water into the underground well strata in quantities and at pressures sufficient to drive or otherwise remove oil from the oil-bearing zones and formations. The strata in such a field is commonly penetrated by several wells, one or more of which is operated as a water-injection or input well and the remainder of which may be operated as oil-producing or output wells. The permeable zones or formations occurring in such strata commonly have varying permeabilities and during the course of the flooding operation it is not unusual to find that one or more of the more permeable zones or formations is taking excessive quantities of the injected water. For example, a permeable oil-bearing zone may continue to take large quantities of water after substantially all of the oil has been removed therefrom, with the result that a large proportion of the injected water may undesirably by-pass less permeable zones which still contain oil in commercial quantities. In order to improve the efficiency of the flooding operation in these instances, it is desirable to selectively plug or otherwise reduce the permeability of the zone which is taking excessive quantities of water, thereby increasing the proportion of the water which enters the other permeable zones.

In United States patent application Serial No. 490,674, entitled "Method of Reducing the Permeability of Underground Formations," which was filed on February 25, 1955, by the applicants herein, it is proposed that an underground permeable formation, such as a partially depleted oil-bearing formation in an oil field undergoing gas repressuring, may be treated by injecting thereinto an aqueous solution and a gas capable of reacting together to form plugging deposits or precipitates in the pore spaces or channels of the formation. This method offers particular advantages in connection with gas repressuring operations. The treatment tends to be preferential in that the greater proportion of the plugging action tends to occur in the more permeable zones. Well packers may be employed, if desired, for isolating a particular zone or formation to be treated, thus causing the treatment to be more selective.

It is a specific object of the present invention to provide an improved method of reducing the permeability of underground well strata such as occur in oil fields undergoing water-flooding, which improved method is selective in that the permeability of any of various permeable zones or formations in such strata may be reduced without substantially, if at all, reducing the permeability of the other zones or formations therein, the method being such that well packers are generally not required to direct the treating agents into the zone or formation selected for treatment.

It is a more general object of the present invention to provide an improved method of reducing the permeability of underground porous earth and rock strata penetrated by bore holes.

It is another object of the invention to provide an improved method of forming water-insoluble plugging deposits or precipitates in the pore spaces or flow channels of a selected underground permeable zone or formation.

It is a further object of the invention to provide an improved method of selectively forming water-insoluble plugging deposits or precipitates in the pore spaces and flow channels of a permeable section of underground well strata in order to reduce the permeability of such section to aqueous fluid such as water.

In accordance with the invention, two streams of aqueous liquid, such as water, are simultaneously conducted at controlled rates downwardly along separate paths into the bore of a well penetrating underground strata which is to be treated in order to reduce the permeability of a selected permeable section thereof. The streams are caused or allowed to meet in the bore hole at an interface opposite the well strata. By controlling the rates of introducing the streams, the interface therebetween is caused to exist or occur at a location such that one stream enters the permeable section which is to be treated and the other stream contacts a section of the strata adjacent to that selected for treatment.

While the interface is maintained at this location, two treating solutions are separately added to the stream entering the section to be treated. One of the treating solutions is an aqueous solution of a metal salt, such as a solution of aluminum sulfate in water, and the other treating solution is an aqueous solution, such as a solution of ammonium hydroxide, which is capable of reacting with the metal salt solution to form water-insoluble deposits or precipitates. The treating solutions tend to enter the well as substantially separate parts of a continuous fluid stream. Sufficient quantities of the treating solutions are included in the stream so that where the solutions come together in the pore spaces and flow channels of the permeable section, plugging deposits or precipitates are formed in the amount required to substantially reduce the permeability of such section and thereby at least partially obstruct or block the flow of fluid therethrough.

The foregoing and other objects and advantages of the invention will become more apparent from the following description when read in connection with the accompanying drawing in which similar reference characters designate similar parts and wherein:

Figure 1 is a vertical sectional view of earth and rock strata penetrated by the bore of a well which is equipped with one arrangement of apparatus, shown partly in elevation and partly in cross-section, which may be used in practicing the invention.

Referring to the drawing in detail, the invention is there illustrated and is hereinafter described, by way of example, with particular reference to its application in connection with improving the efficiency of a water-injection or input well such as may be operated during the course of water-flooding an oil field. A bore hole 10 is there shown penetrating underground strata which includes an upper permeable zone or formation 12 and a lower permeable zone or formation 14. The upper zone or formation 12 may contain oil or other fluid desired to be recovered by the water-flooding operation. The lower permeable zone or formation 14 may be one from which substantially all of the oil has previously been removed or which for some other reason is taking excessive quantities of the water injected in the course of performing the water-flooding operation.

A well casing 16 is shown extending from the surface of the ground downwardly into the bore hole 10 to a point above the upper permeable zone or formation 12. A casing head 18 is shown threadedly or otherwise connected to the upper end portion of the casing 16. A tubing 20 is shown extending from above the surface of the ground downwardly through a central opening suitably provided in the casing head 18 and axially through the casing 16 and then downwardly along the uncased portion of the bore hole 10 to a point therein below the lower permeable zone or formation 14.

A pipe or conduit 22 extends between the casing head 18 and a container 24 which is adapted to store fluid substances at the surface near the well. Between the container 24 and the casing head 18 there is shown a pump 26 and a flowmeter 28 each of which is coupled between sections or pieces of the conduit 22. The arrangement is such that by operating the pump 26, fluid substances may be conducted from the container 24 through the conduit 22 into the annular space between the casing 16 and the tubing 20 and thence caused to flow around the tubing 20 downwardly into the bore hole 10. The rate of flow of such substances may be ascertained from the flowmeter 28 and may be controlled by adjusting the pumping rate of the pump 26.

A pipe or conduit 30 is shown extending laterally out of the upper end portion of the tubing 20. The conduit 30 includes three branches, each extending to one of three containers 32a, 32b and 32c which are adapted to store fluid substances at the surface near the well. Between the containers 32a, 32b and 32c and the tubing 20 there is shown a pump 34 and a flowmeter 36, each of which is coupled between sections or pieces of the main portion of the conduit 30.

Between the pump 34 and the containers 32a, 32b and 32c are shown three valves 38a, 38b and 38c. The valve 38a is coupled between sections or pieces of the branch of the conduit 30 which extends to the container 32a. Similarly, the valve 38b is connected in the branch which extends to the container 32b and the valve 38c in the branch which extends to the container 32c. By operating the pump 34 fluid substances may be conducted from the containers 32a, 32b and 32c through the pipe 30 into the tubing 20 and thence through the tubing 20 downwardly into the bore hole 10. By manipulating the valves 38a, 38b and 38c, it is possible to select fluid substances from whichever of the containers 32a, 32b and 32c is desired.

A radioactivity detector 40 is shown suspended in the bore hole 10 by means of a cable 42 which extends upwardly therefrom to the surface of the ground, passing through the tubing 20 and a cap 44 provided on its upper end. The cable 42 includes one or more electrical conductors or wires for carrying the output of the detector 40 to the surface. At the surface, the cable 42 passes over a cable hoisting device 46 which may be operated to raise or lower the cable 42 and thereby control the depth of the detector 40 in the bore hole 10. The electrical conductors or wires of the cable 42 are connected at the surface through an amplifier 48 to an instrument 50 which makes a record of the output of the detector 40 and preferably also continuously indicates the depth of the detector 40 in the bore hole 10.

In one way of proceeding using the arrangement of Figure 1, a quantity of water is first placed in the container 24 and another quantity of water is placed in one of the containers, such as the container 32a, which is connected through the conduit 30 to the tubing 20. The valve 38a may be initially open, permitting water from the container 32a to reach the pump 34. In the arrangement shown there is no valve connected in the conduit 22 and, thus, the water in the container 24 is permitted to reach the pump 26.

Where the depth of the upper limit of the zone or formation 14 is already known, such as from the record of a logging operation previously performed on the well, the cable hoisting device 46 is operated, if necessary to move the radioactivity detector 40 to a position in the tubing 20 corresponding to the upper limit of the zone or formation 14.

The pumps 26 and 34 are then operated, causing a stream of water from the container 24 to flow downwardly around the tubing 20 into the bore hole 10 and another stream of water from the container 32a to flow downwardly through the tubing 20 into the bore hole 10. A small amount of tracer material, such as a small amount of a radioactive substance in the form of sodium iodide, is then placed in one of the streams, such as in the stream flowing downwardly around the tubing 20.

The stream flowing downwardly through the tubing 20 passes out of the lower end thereof and upwardly around the tubing 20 until it meets the stream flowing downwardly around the tubing 20. An interface 52 between radioactive and non-radioactive water is established in the bore hole 10 where the two streams meet opposite the underground strata.

The pumping rates of the pumps 26 and 34 are then adjusted so as to move the interface 52 to a location in the bore hole 10 opposite the detector 40, as determined by observing the instrument 50 which makes a continuous record of the output of the detector 40. It is apparent that when the interface 52 is in this location, as shown in the drawing, the stream of water introduced into the well through the tubing 20 is then entering the lower permeable zone or formation 14 while the stream of water introduced into the well through the annular space between the tubing 20 and the casing 16 is contacting higher zones or formations, such as the upper zone or formation 12, which are also traversed by the uncased portion of the bore hole 10.

During or prior to the introduction of the streams of water from the containers 24 and 32a into the well, as aforesaid, aqueous treating solutions are prepared and placed in the containers 32b and 32c so that they will be ready for introduction after the interface 52 has been established at the desired location. The values 38b and 38c will ordinarily be initially closed so that the treating solutions do not initially enter the stream being pumped into the tubing 20 by the pump 34.

If desired, the treating solutions may be prepared at a remote location and brought to the well site in suitable containers. In one way of proceeding, a quantity of a concentrated solution of ammonium hydroxide is obtained from commercial sources and brought to the well site where it is placed in the container 32b prior to being introduced into the well.

The aluminum sulfate solution may be prepared at the well site using the regular commercial grade of aluminum sulfate which has 18 molecules of water of crystallization. If desired, the aluminum sulfate may be mixed with water in the container 32c. It is believed that satisfactory results will be obtained in most instances using from about 150 pounds to about 400 pounds of aluminum sulfate to each 100 gallons of water, but experience may show that solutions of higher or lower concentration will provide satisfactory results in particular types of operation.

The amount and the degree of concentration of each of the treating solutions required for best results will depend to a large extent on the conditions prevailing in the particular well which is to be treated. In general, the more concentrated treating solutions are preferred, particularly where large flow channels or passageways such as occur in fractured formations are likely to be encountered. Even so, several treatments may be required in some instances to obtain the desired permeability reduction.

As a specific example, a well in the Salem Field, Marion County, Illinois, was treated using a total of 52 gallons of a concentrated solution of ammonium hydroxide and a total of 210 gallons of an aluminum sulfate solution prepared using 600 pounds of aluminum sulfate. As another example, a well in Hamilton County, Illinois, was treated using a total of 130 gallons of a concentrated solution of ammonium hydroxide and a total of 164 gallons of an aluminum sulfate solution prepared using 600 pounds of aluminum sulfate.

Upon the interface 52 being established and the treating solutions being prepared and placed in the containers 32b and 32c, as aforesaid, the record of the output of the detector 40 may be checked, such as by observing the instrument 50, and any necessary changes in the pumping rates of the pumps 26 and 34 may be made to correct for any movement of the interface 52 away from its desired location. In this connection it should be noted that the treatment may be effective in certain operations even if the interface 52 moves to some extent away from its exact desired location. One advantage obtainable using the arrangement of Figure 1 resides in the fact that quite accurate control of the location of the interface 52 is possible, thus permitting greater accuracy in placing the treating solutions in the particular zone or formation selected for treatment.

While the interface 52 is being maintained, as aforesaid, the valve 38b is then opened and the valve 38a is closed. As the pumps 26 and 34 continue to operate, the pump 34 soon is pumping ammonium hydroxide from the container 32b into the tubing 20 and then downwardly through the tubing 20 into the bore hole 10. The water ahead of the ammonium hydroxide is displaced from the tubing 20 into the bore hole 10 and then enters the permeable zone or formation 14.

After a desired first batch or quantity of ammonium hydroxide has been pumped into the well, the valve 38c is then opened and the valve 38b is closed. The pump 34 soon begins pumping the aluminum sulfate solution from the container 32c into the tubing 20 and then downwardly through the tubing 20 behind the ammonium hydroxide. After the desired amount of aluminum sulfate solution has entered the well, the valve 38b is again opened and the valve 38c is closed. The pump 34 is soon again pumping ammonium hydroxide from the container 32b into the tubing 20 and then downwardly through the tubing 20 behind the aluminum sulfate solution.

After the desired amount of a second batch or quantity of ammonium hydroxide has been pumped into the well behind the aluminum sulfate solution, the valve 38a is opened once more and the valve 38b is closed. The pump 34 is soon again pumping water from the container 32a into the tubing 20 and then downwardly through the tubing 20 behind the second batch of ammonium hydroxide. The pumping continues and the batches of treating solutions are displaced by the water from the tubing 20 into the bore hole 10 and then into the permeable zone or formation 14.

As the treating solutions are thus pumped into the well, the record of the output of the detector 40 may be checked at frequent intervals and adjustments may be made in the pumping rates of the pumps 26 and 34, if necessary, to maintain the interface 52 at the desired location.

The order of introducing the treating solutions is not critical and the foregoing procedure may be varied in several ways. For example, a quantity of spacer fluid, such as water, may be introduced into the well between successive batches of the treating solutions, such as where it is desired to avoid insofar as possible premature coming together of the ammonium hydroxide and the aluminum sulfate solutions. Also, the ammonium hydroxide may be introduced all in one batch, preferably before the introduction of the aluminum sulfate solution. Also, the treating solutions may each be introduced into the well in small batches or quantities and in alternating order. Further, the radioactive tracer may be included in the treating solutions and the water introduced therewith rather than in the stream which does not contain the treating solutions.

In any event it is desirable for the ammonium hydroxide and the aluminum sulfate solution to be separately and successively added to the fluid stream entering the zone or formation selected for treatment, allowing each of the solutions to permeate the strata for a considerable distance. This is necessary in order that the injected solutions upon coming together will tend to form deposits or precipitates which extend into the pore spaces and flow channels of the zone or formation for a considerable distance radially from the well bore.

Various other treating solutions may be used instead of the ammonium hydroxide and the aluminum sulfate solution, but the solutions used should, of course, be selected so as to be capable of reacting together to form plugging deposits or precipitates in amounts sufficient to at least partially obstruct or block the pore spaces and flow channels of the permeable zone or formation selected for treatment.

For example, an aqueous solution of calcium chloride and an aqueous solution of sodium carbonate upon reacting together produce a calcium carbonate deposit or precipitate which is water-insoluble. Various other well known and commercially available metal salt solutions are capable of reacting together to form water-insoluble deposits or precipitates. The conditions prevailing in the particular well to be treated, as well as the relative cost and availability of the treating agents, should be considered in determining which ingredients will be best suited for use in treating a particular well.

It is believed that satisfactory results will generally be obtainable using as one treating solution a quantity of concentrated ammonium hydroxide and as the other treating solution either a quantity of a solution of aluminum sulfate in water, prepared as aforesaid, or a quantity of a solution of ferric chloride in water. Where the ferric chloride solution is used, crystalline technical iron (ferric) chloride which contains 6 molecules of water of crystallization is recommedned. About the same ratio of solids-to-liquid will be required in preparing such a ferric chloride solution as is required in preparing an aluminum sulfate solution to be used where the same well conditions prevail.

As hereinbefore stated, one advantage of the arrangement shown in the drawing resides in the fact that the location of the interface 52 may be controlled with considerable accuracy. Thus, during the performance of the treating operation the pumping rates of the pumps 26 and 34 may be adjusted, if necessary, based upon information obtained by observing the instrument 50 which makes a continuous record of the output of the radioactivity detector 40. In certain instances, however, information may be independently available concerning the ratio of pumping rates required to maintain the interface 52 at substantially the desired location.

In particular, a permeability log or "injectivity profile" of the well strata may have previously been obtained in order to ascertain which of several permeable zones or formations should be treated using the method of the present invention. In connection with the performance of such a logging or profiling operation using certain methods, such as the method described in United States Letters Patent No. 2,700,734, which was granted on January 25, 1955, to Egan and Herzog, information may also have been obtained from which the desired pumping rates of the pumps 26 and 34 may be determined. Where such information is available, it may not be necessary to employ a detector, such as the detector 40, and associated apparatus, such as the cable 42, hoisting device 46, amplifier 48 and instrument 50, which in the arrangement shown are primarily for the purpose of making it easier to adjust the pumping rates of the pumps 26 and 34 so as to maintain the interface 52 at the desired location.

If desired, the effectiveness of the plugging action occurring as a result of using the present invention may be determined by subsequently performing a permeability logging or "injectivity profiling" operation. The comparison between the record of such an operation performed subsequent to treatment and one performed on the same well prior to treatment will oftentimes prove helpful in determining whether or not to apply a second treatment.

In many instances, however, the effectiveness of the treatment will be apparent to an experienced operator as the treating solutions are injected. Thus, as the plugging deposits or precipitates are formed in sufficient amounts to reduce the permeability of the zone or formation being treated, it will become more difficult to inject additional quantities of the treating solutions. This condition will ordinarily be accompanied by a rise or increase in the pump pressure required to maintain a constant pumping rate of the stream containing the treating solutions.

It will now be apparent to those skilled in the art that the present invention may be employed where it is desired for some reason to reduce the permeability of any particular one of various zones or formations which are penetrated by the bore of a well. Ordinarily the depth or location of the zone or formation to be treated should be known or else the pumping rates required to be used in order to cause one of the fluid streams to enter such zone or formation should be known or available.

While the invention has been herein described with particular reference to certain arrangements, procedures and ingredients which may be employed, various modifications, equivalents and alternatives thereof coming within the spirit of the invention will now be apparent to those skilled in the art. Accordingly, the invention is best defined by the scope of the appended claims.

What is claimed is:

1. The method of treating permeable underground strata penetrated by a bore hole in order to reduce the permeability of a section thereof which comprises the steps of simultaneously conducting two streams of liquid downwardly along separate paths into the bore hole, one and only one of said streams containing in one portion thereof a quantity of an aqueous solution of a metal salt and in a substantially separate portion thereof a quantity of a solution capable of reacting with said metal salt solution to form water-insoluble deposits, causing said streams to meet in the bore hole and enter adjacent sections of the strata, and continuing the treatment so as to maintain the entry of the stream containing the solutions into one of said sections until the solutions have come together therein and formed water-insoluble deposits reducing the permeability of said one section.

2. The method as claimed in claim 1 wherein a quantity of a spacer fluid is included between said solutions in the stream entering the section to be treated.

3. The method as claimed in claim 1 wherein said metal salt solution is prepared by dissolving a quantity of aluminum sulfate in water and wherein the solution reacting therewith is a concentrated solution of ammonium hydroxide.

4. The method as claimed in claim 1 wherein said metal salt solution is prepared by dissolving a quantity of ferric chloride in water and wherein the solution reacting therewith is a concentrated solution of ammonium hydroxide.

5. The method of treating underground strata penetrated by a bore hole in order to reduce the permeability of a selected permeable section thereof which comprises the steps of simultaneously conducting two streams of aqueous liquid at controlled rates downwardly along separate paths into the bore hole, one and only one of said streams containing in one portion thereof a quantity of an aqueous solution of a metal salt and in a substantially separate portion thereof a quantity of an aqueous solution capable of reacting with said metal salt solution to form water-insoluble deposits, the other of said streams including a quantity of a tracer material, causing said streams to meet in the bore hole at an interface opposite the underground strata, determining the location of said interface by measuring the tracer material content of liquid throughout at least a portion of the bore hole, adjusting the rates of conducting said streams so as to position said interface at a desired location between the section of said strata selected for treatment and an adjacent section of said strata, maintaining the adjusted rates of conducting said streams to cause the stream containing said solutions to enter the strata section selected for treatment and to cause the other stream to enter the adjacent section, and continuing the treatment so as to maintain the entry of the stream containing said solutions into the strata section selected for treatment until the solutions have come together therein and formed water-insoluble deposits reducing the permeability of said section.

6. The method as claimed in claim 5 wherein said tracer material is included throughout the stream containing said solutions rather than in the other stream.

7. The method as claimed in claim 5 wherein said tracer material is a radioactive substance.

8. The method as claimed in claim 5 wherein a quantity of an aqueous fluid is included as a spacer fluid between said aqueous solutions in the stream entering the section to be treated.

9. The method of treating underground strata penetrated by a bore hole in order to selectively reduce the permeability of one section thereof without appreciably reducing the permeability of other sections thereof which comprises the steps of pumping two streams of water downwardly into the bore hole, one through tubing extending downwardly into the bore hole, at least to the depth of the permeable section to be treated and the other through the annular space between said tubing and the wall of the bore hole, one of said streams including a small quantity of a radioactive substance and the other being non-radioactive, allowing said streams to meet in the bore hole at an interface opposite the underground strata, determining the location of said interface by measuring the radioactivity of fluid throughout at least a portion of said bore hole, adjusting the pumping rates of said streams so as to position and maintain said interface at a location such that one stream is contacting and entering the strata through the section to be treated and the other stream is contacting and entering an adjacent section of the strata, separately and successively adding to the stream entering the section to be treated a quantity of an aqueous solution of a metal salt and a quantity of a solution capable of reacting with said metal salt solution to form water-insoluble deposits, and continuing the treatment so as to maintain the entry of the stream containing the solutions into the section to be treated until the solutions have come together in the pore spaces and flow channels thereof and have formed water-insoluble plugging deposits reducing the permeability of such section.

10. The method of treating underground strata penetrated by a bore hole in order to reduce the permeability of a permeable section thereof which comprises simultaneously pumping two streams of water at controlled rates downwardly along separate paths into the bore hole, allowing said streams to meet in the bore hole opposite the underground strata, the pumping rates of said streams being selected so that one stream contacts and enters the strata through the permeable section to be treated and the other stream contacts and enters an adjacent section of the strata, and maintaining said pumping rates for a period of time while separately and successively adding quantities of aqueous treating solutions to the stream entering the section to be treated, said treating solutions including a quantity of a concentrated solution of ammonium hydroxide followed by a quantity of an aqueous solution of aluminum sulfate, said pumping rates being maintained until the treating solutions have entered and come together in the permeable section to be treated and have formed water-insoluble deposits at least partially plugging said section.

11. The method as claimed in claim 10 wherein said ammonium hydroxide solution is followed by a quantity of a spacer fluid which is in turn followed by a quantity of said aluminum sulfate solution.

References Cited in the file of this patent

UNITED STATES PATENTS

| | | |
|---|---|---|
| 2,272,672 | Kennedy | Feb. 10, 1942 |
| 2,332,822 | Williams | Oct. 26, 1943 |
| 2,670,048 | Meaul | Feb. 23, 1954 |
| 2,718,263 | Heilman et al. | Sept. 20, 1955 |